Figure 1:
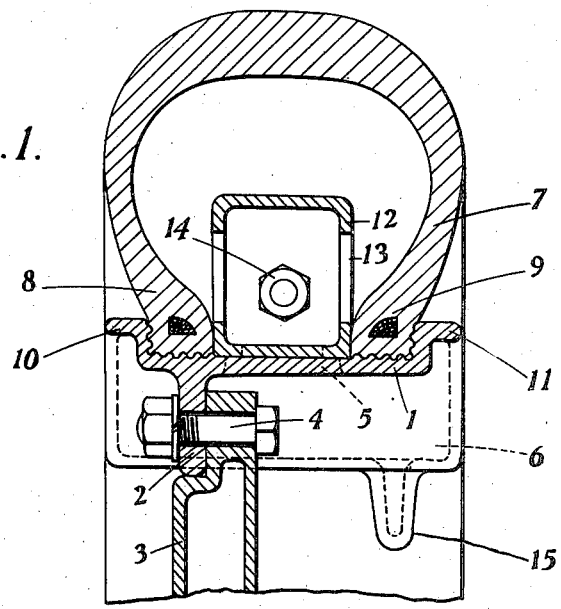

March 16, 1937.   A. C. STEVENSON   2,074,284
RIM, WHEEL, AND TIRE
Filed June 10, 1932   6 Sheets-Sheet 1

INVENTOR
Andrew C. Stevenson
BY
ATTORNEY

March 16, 1937. A. C. STEVENSON 2,074,284
RIM, WHEEL, AND TIRE
Filed June 10, 1932 6 Sheets-Sheet 2
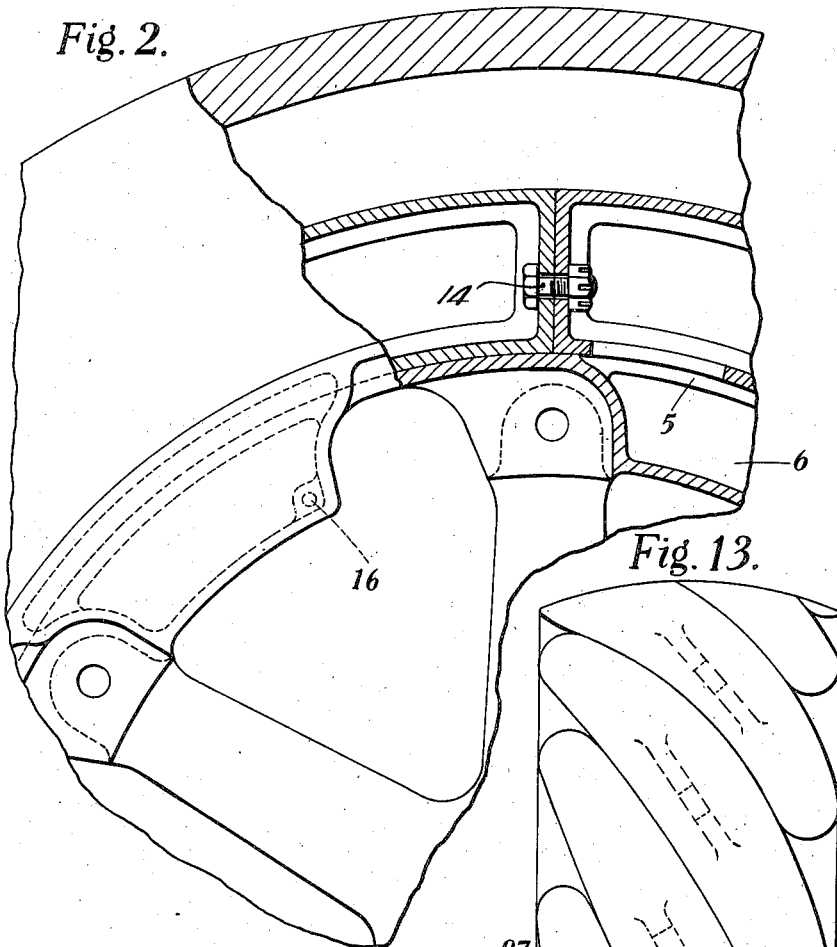
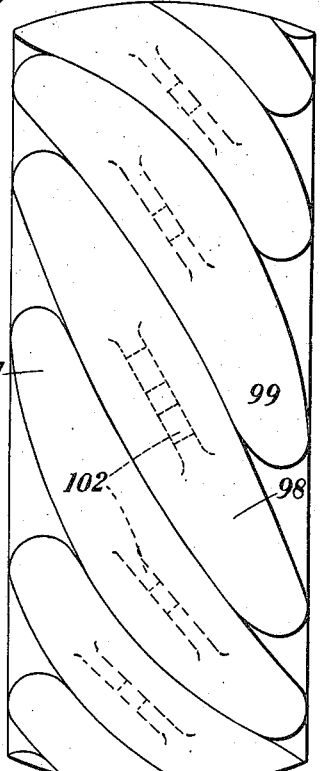
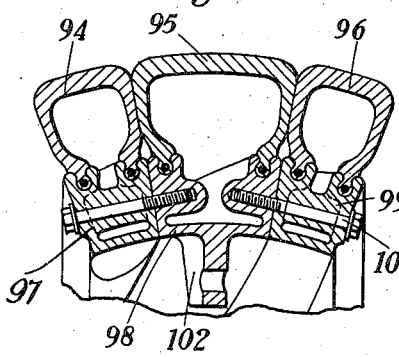
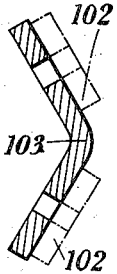
INVENTOR
Andrew C. Stevenson
BY
Cushman, Byant, Darby & Cushman
ATTORNEY March 16, 1937.  A. C. STEVENSON  2,074,284
RIM, WHEEL, AND TIRE
Filed June 10, 1932   6 Sheets-Sheet 3

INVENTOR
Andrew C. Stevenson
BY
ATTORNEY

March 16, 1937.   A. C. STEVENSON   2,074,284
RIM, WHEEL, AND TIRE
Filed June 10, 1932   6 Sheets-Sheet 4

INVENTOR
ATTORNEY

March 16, 1937.  A. C. STEVENSON  2,074,284
RIM, WHEEL, AND TIRE
Filed June 10, 1932    6 Sheets-Sheet 5

INVENTOR
Andrew C. Stevenson
BY
Cushman, Bryant, Darby & Cushman
ATTORNEY

Patented Mar. 16, 1937

2,074,284

UNITED STATES PATENT OFFICE 2,074,284

RIM, WHEEL, AND TIRE

Andrew Creery Stevenson, Bervie, Wood Lane,. Fleet, England

Application June 10, 1932, Serial No. 616,522
In Great Britain June 19, 1931

7 Claims. (Cl. 152—21)

This invention relates to vehicle wheels and more particularly to wheel rims and pneumatic tires of the kind in which the flexible tire is sealed to the rim so as to be air tight and in which supplementary means are provided to prevent complete collapse of the tire if the flexible tire is punctured. The tires according to this invention are particularly intended for use on heavy vehicles. The road contacting portion of such tires, as is commonly known, is necessarily formed of very strong non-stretchable material and is provided with beaded reinforced edges which are non-stretchable. It is to this type of tire to which the present invention relates. The invention also provides for the effective cooling of the tire which is of particular importance for tires used on heavy vehicles. A still further object of the invention is to provide a construction of rim and tire having the features just referred to and in which the rim and tire are readily detachable from the hub and spokes or like portions of the wheel to allow of replacement and repair. As regards ready detachability, the present invention may be regarded as an improvement in or modification of the invention forming the subject of my prior Patent No. 1,230,616 patented June 19, 1917.

According to this invention a pneumatic tire and wheel rim comprises a rigid rim portion, a flexible tire portion sealed at its edges to the peripheral surface of the rigid rim portion to form a closed chamber for elastic fluid and supplementary means for preventing complete collapse of the tire in the event of the opening of the chamber as by a puncture.

The said supplementary means may comprise a rigid or flexible auxiliary or arresting rim within the tire itself or may consist in dividing the tire into independent sections so arranged that in the event of the collapse of one section the adjacent section or sections serve to give the necessary support to prevent the complete collapse of the tire. In connection with the last mentioned feature constructions of tire and rim are provided which allow of the replacement of any one section of the rim and/or tire without removal of the whole tire and rim.

For the purpose of providing the necessary cooling the rim, or section of the rim if in sections, may be formed with a chamber or chambers in communication with the space or spaces within the flexible portion or portions.

The above mentioned and other features of the invention will be fully understood from the following description of various embodiments of the invention taken in connection with the accompanying drawings in which:—

Figure 3:
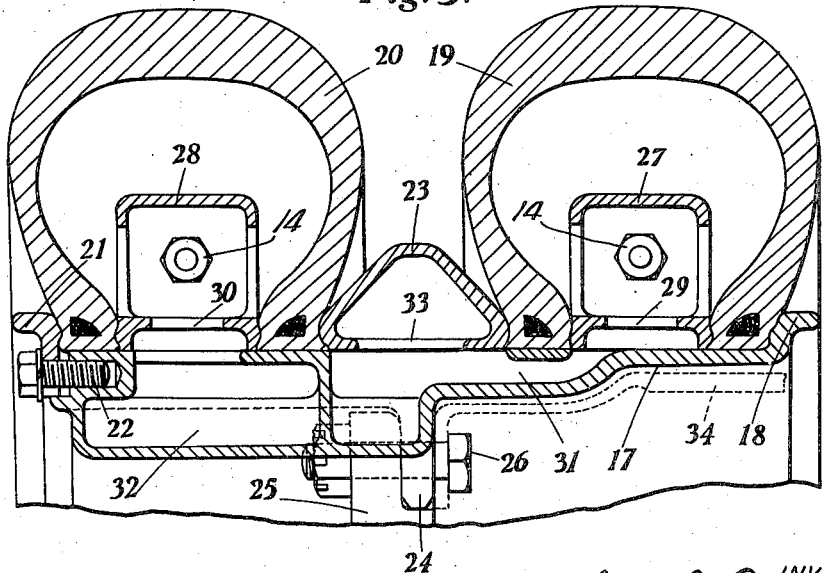
Figure 5:
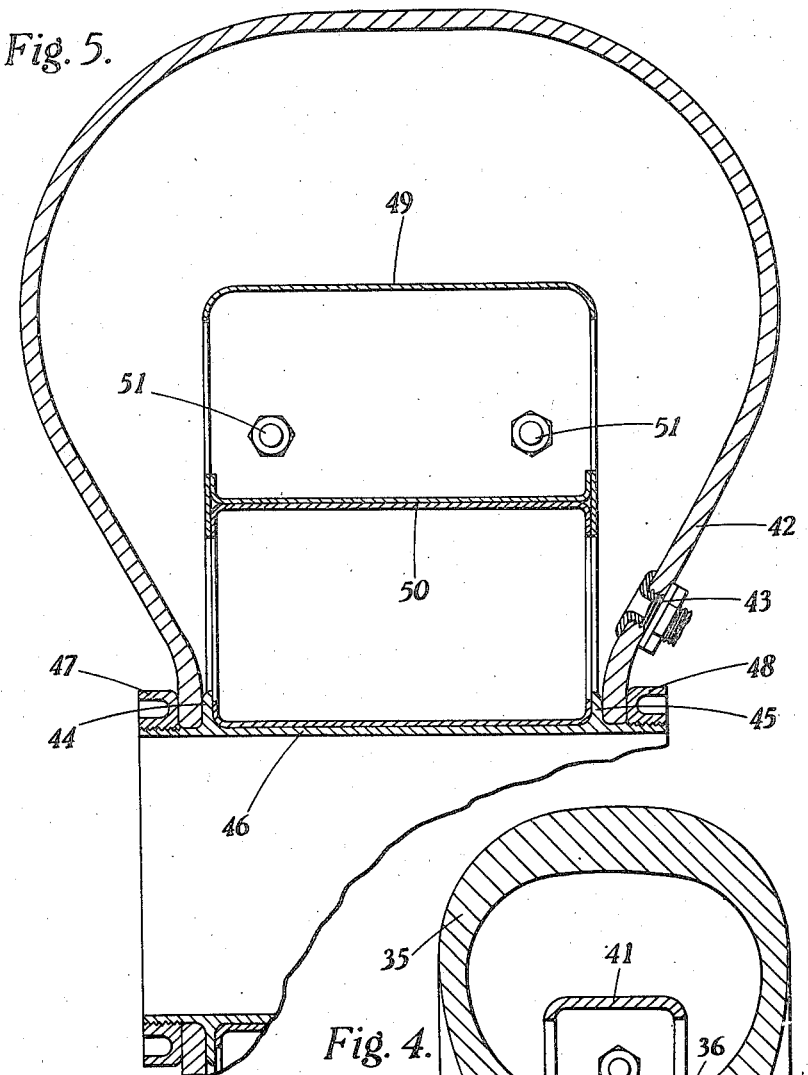
Figure 4:
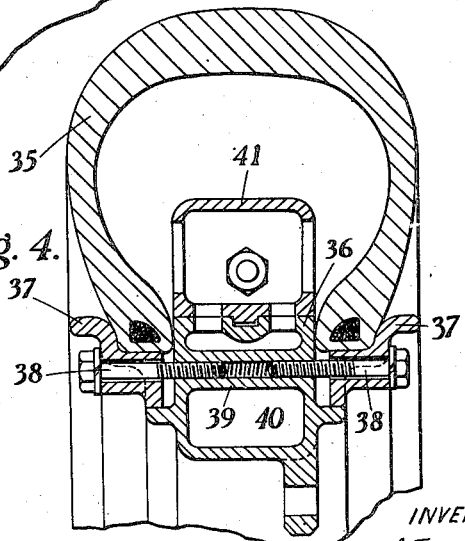
Figure 6:
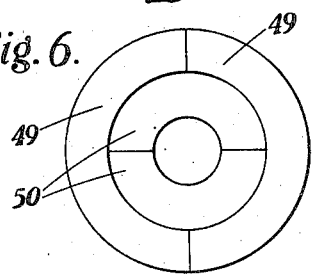
Figure 8:
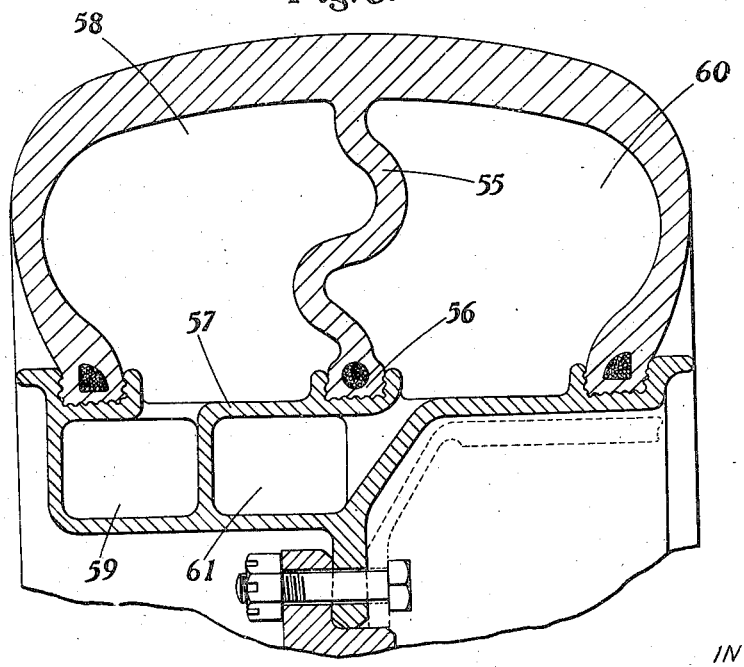
Figure 9:
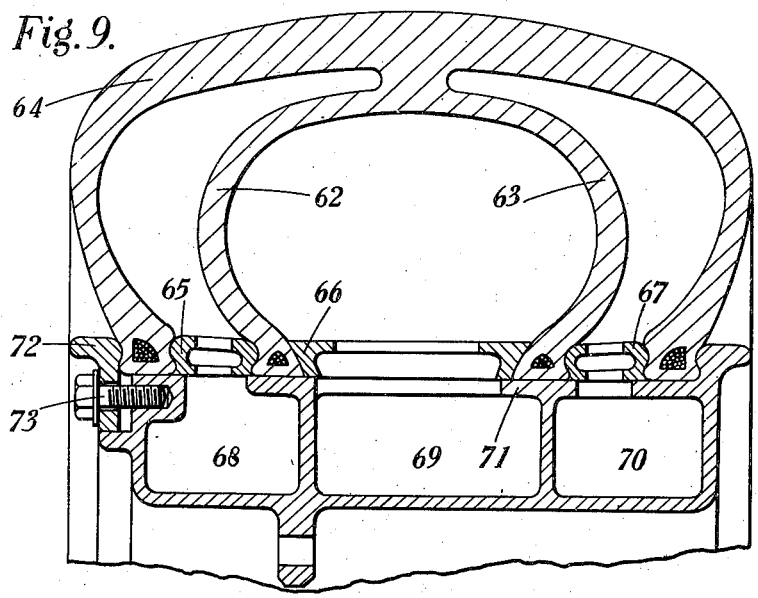
Figure 10:
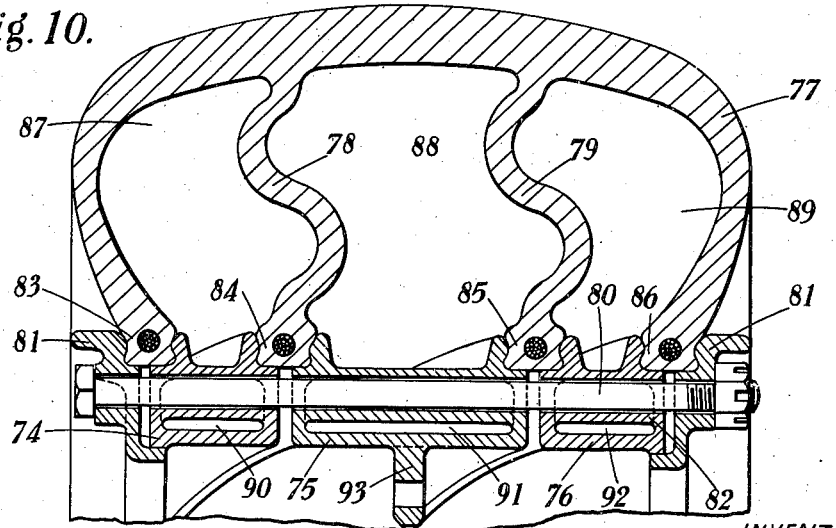
Figure 11:
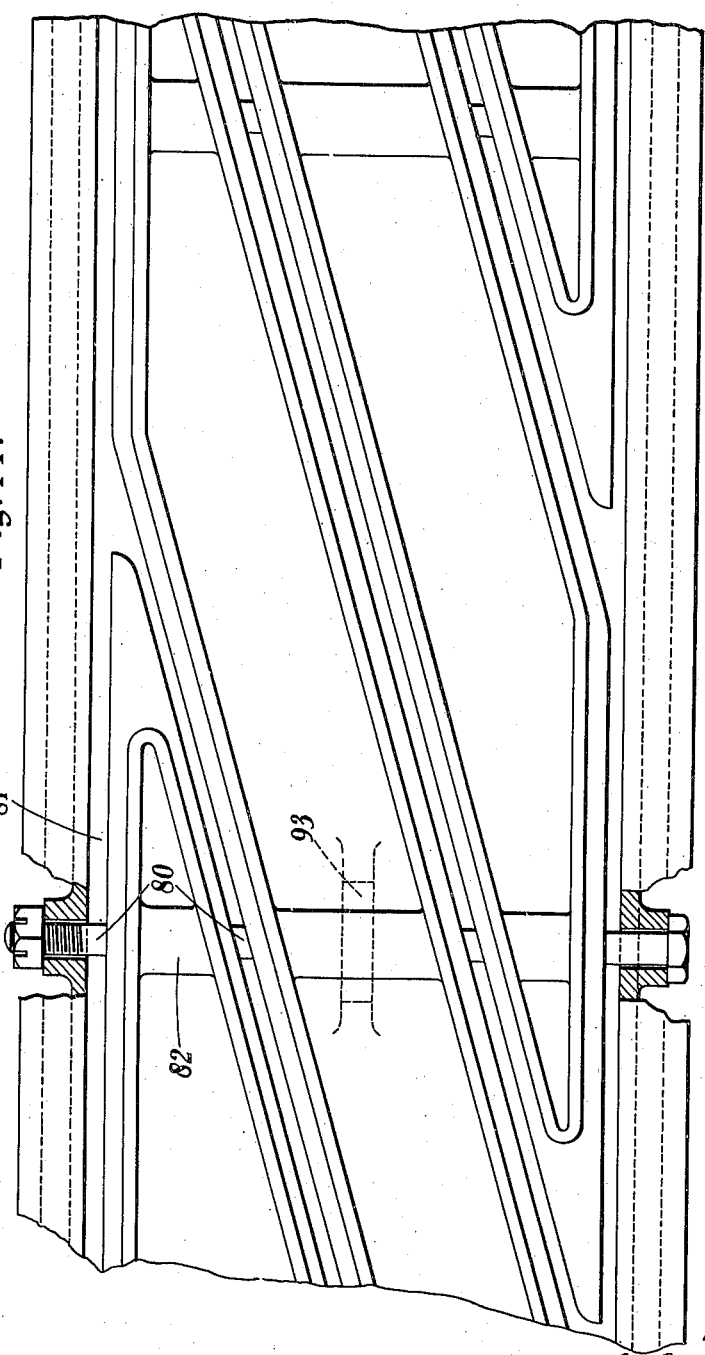

Fig. 1 is a section of a tire and wheel rim showing its attachment to the spokes or spoke structure of the wheel, according to one embodiment of the invention, Fig. 2 is a part side elevation of the same partly in section, Fig. 3 is a section of one form of twin tire according to the invention, Fig. 4 is a section of a tire according to another embodiment, Fig. 5 is a section showing the application of the invention to the type of tire used for the landing wheels of aircraft, Fig. 6 is a diagrammatic view illustrating the assembly of the same, Figs. 7, 8, 9 and 10 are sectional views showing other embodiments of the invention, and Fig. 11 is a plan view of a portion of the rim shown in Fig. 10.

Fig. 12 is a sectional view showing another embodiment of the invention, the section being taken substantially in a plane containing the axis of the wheel, Fig. 13 is a part plan outline view of the rim portions shown in Fig. 12, and Fig. 14 is a section perpendicular to the axis of a spoke of a wheel to which the embodiment of the invention shown in Figs. 12 and 13 may be applied.

Referring to Figs. 1 and 2, the rim of the wheel comprises a rigid rim I of metal from which extend inwardly directed lugs 2. The rim I is attached to the spokes 3, or other spoke structure or skeleton wheel, by means of bolts 4 in a similar manner to that described in the specification of my prior Patent No. 1,230,616 patented June 19, 1917. Between the lugs 2 the rim is formed with openings 5 leading into chambers 6 integral with the rim portion I. The flexible portion 7 of the tire has its edges 8 and 9 vulcanized to the rim I and the upturned edges or beads 10 and 11 thereon. Within the flexible tire 7 and resting on the rim I is an additional arresting or supplementary rim or tire 12 which is of rectangular cross-section with openings 13 in its sides. To allow of assembly, as hereinafter described, the arresting rim 12 is formed in two or more sections which are secured together by bolts 14.

By the provision of the chambers 6 the volume of the space for the pneumatic medium is increased beyond that provided in the ordinary construction of pneumatic tire thereby giving increased resiliency. This construction also increases the cooling surface and thereby reduces the variation in pressure under running conditions. To increase still further the cooling surface, the chambers 6 may have their walls formed with cooling fins such as indicated at 15 or of any other suitable form. Moreover more effective cooling is obtained due to the air in the tire being in direct contact with the metal parts which are themselves in contact with the external air.

The valve through which the tire is filled may be arranged in one of the side walls or in the inner wall of one of the chambers 6. In Fig. 2 the opening to receive a valve is indicated at 16.

Under normal conditions the auxiliary or arresting rim 12 is not in action but under an abnormal deflection or in the event of a puncture the outer portion of the tire 7 may come into contact with this arresting rim at the point nearest the ground, thus preventing total collapse of the tire and consequent risk of accident or undue strain being placed on the tire. The outer surface of the arresting rim may be rounded off in such manner as to let the inner surface of the tread sit on the same with the least change of shape.

The tire used may be of the ordinary construction or it may be of strengthened form with larger butt edges and with extra reinforcement.

In assembling the tire, the sections of the arresting rim 12 are inserted in the flexible tire 7 which is then placed over the rim with one edge say 8 against the edge 10 of the rim, the other edge 9 hanging over the edge 11 of the rim. By inserting the hands under the edge 9, the sections of the arresting rim can be bolted together after which the edge 9 is pressed into position over the edge 11 of the rim. The two edges of the tire are then vulcanized to the rim.

Fig. 3 shows one embodiment of the invention as applied to twin tires. The rim 17 is formed with one bead or edge 18 and the edges of the two tires 19 and 20 are sealed on the rim by means of a ring 21 and screws 22 instead of vulcanizing them as described in connection with Figs. 1 and 2. A hollow spacing ring 23, freely slidable on the rim 17, separates the two tires. The rim is formed with central lugs 24 for attachment to the spokes 25 by means of bolts 26. Arresting rims 27 and 28 may be provided within the two tires 19 and 20 respectively, these rims being similar to the arresting rim shown in Figs. 1 and 2 and having openings 29 and 30 leading to chambers 31 and 32 in the rim. The inner portions of the arresting rims serve as spacers for the edges of the tires. There are openings such as 33 from the hollow spacing ring 23 to the chamber 31 thereby increasing the air space for the tire 19.

The arrangement of the lugs 24 near the center of the rim 17 and the form of the chamber 31 permits of a brake drum 34 of large diameter being attached to the wheel.

The tires can be assembled from one side of the rim, the tire 19 being first placed in position, the arresting rim 27 having been inserted and the sections bolted together. The spacing ring 23 is slid on to the rim after which the tire 20 with the arresting rim 28 and the ring 21 are placed in position and the tires sealed by tightening up the screws 22.

In the embodiment of the invention shown in Fig. 4, the inner edges of the tire 35 are clamped against the rim 36 by rings 37 and screws 38 entering cylindrical parts 39 extending across the chamber or chambers 40 in the rim. The arresting rim 41 rests on and is keyed to the outer wall of the rim.

Fig. 5 shows the application of the invention to a large sized and relatively thin walled tire of the type used for landing wheels of aircraft. The edges of the tire 42, which is shown with its valve 43, are clamped against collars 44 and 45 on the cylindrical rim 46 by means of rings 47 and 48 which screw on to the rim 46. Within the tire is an arresting rim formed of two cylindrical hollow rings 49 and 50, each being formed in two sections as diagrammatically illustrated in Fig. 6.

In assembly the sections of the arresting rim are first inserted in the tire with the junctions of the sections 49 at right angles to the junctions of the sections 50. The tire is then placed over the rim 46 from one side and the edges allowed to hang over the ends of the rim. The outer sections 49 of the arresting rim are bolted together by bolts 51 thereby also clamping the sections 50 in position on the rim. The edges of the tire are placed against the collars 44 and 45 and clamped by the rings 47 and 48.

The provision of an arresting rim for tires on the landing wheels of aircraft is of particular importance as in the event of a puncture occurring and the tire completely collapsing there is liability of the wings being damaged by coming into contact with the ground.

Figure 7:
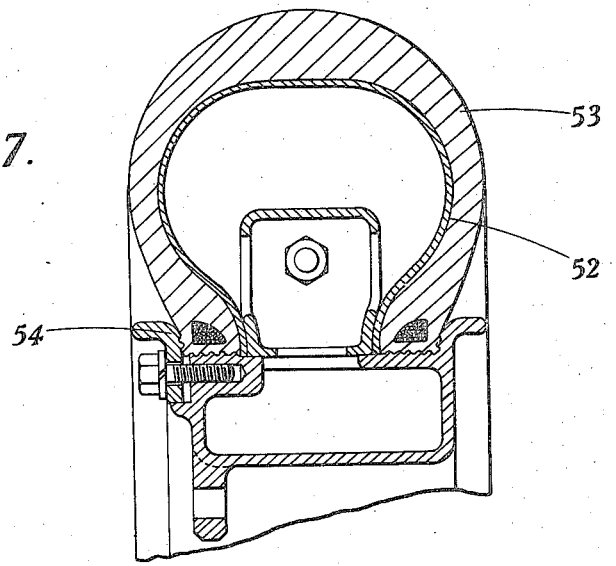

As an additional precaution against leakage of air in a tire and rim according to this invention a liner of rubber or the like may be fitted within the tire. One form of such a construction is shown in Fig. 7. The liner 52 is separate from the tire 53 but its edges are clamped in place together with the edges of the tire by means of a ring 54.

In the embodiment of the invention shown in Fig. 8, the equivalent of a twin tire is obtained and the arresting means for preventing total collapse of the tire are formed by dividing the tire into two independent air spaces by means of a central flexible wall 55 formed integrally with the tire, the edge 56 of this wall being vulcanized to the rim 57. The air space 58 of the tire is in communication with a chamber 59 in the rim and the air space 60 with the chamber 61. The edges of the outer wall of the tire are shown as being vulcanized to the rim 57. Such a construction as shown in Fig. 8 has the advantage as compared with a twin tire that for the same load carrying capacity its diameter and breadth are both smaller.

A modified form of the tire is shown in Fig. 9 in which two inner walls 62 and 63 are formed integral with and within the outer tire 64. The edges of the walls are separated by spacing rings 65, 66 and 67 with openings through them giving access to the chambers 68, 69 and 70 in the rim 71. The edges of the tire are shown as being clamped in position by a ring 72 and screws such as 73.

The air spaces within tires acording to this invention may be divided into sections by transverse walls so that each section forms an independent air space with an independent air valve and there being preferably corresponding air chambers in the rim of the wheel.

Figs. 10 and 11 show an embodiment of the invention having the features just referred to and the sections of the rim also being separate to allow of easy replacement without the necessity of removing the complete tire. The rim is formed in sections such as 74, 75, and 76, the adjacent walls of the sections being in planes inclined to the axis of the wheel. The flexible tire 77 is formed with transverse walls 78 and 79 corresponding to the spaces between the sections 74, 75 and 76 of the rim. The sections of the rim are drawn together by bolts 80 extending through clamping rings 81 and bosses or tunnels 82 formed in the sections 74, 75 and 76 and thereby clamping the edges 83, 84, 85 and 86 of the outer tire and transverse walls of the same. Each air space 87, 88 and 89 is in communication with chambers 90, 91 and 92 respectively formed in the sections of the rim. The sections of the rim are formed with one or more lugs such as 93 to provide for attachment to the spokes or spoke structure of the wheel. As shown in Fig. 11, the bolts extend through the ends of each section of the rim so that on tightening up the bolts the sections are given a rotational motion thereby effecting a firm clamping of the edges of the tire and transverse walls of the same. To allow of the said rotational movement the holes through which the bolts extend are of larger diameter than the bolts.

The construction of tire shown in Figs 10 and 11 permits of any one section of the rim, in the event of damage, being replaced without removal of the whole tire and rim. Further with such a construction in any plane containing the axis of the wheel or in other words at the point where the wheel touches the ground there are always three sections of the tire.

The tires may be formed with completely independent and separate sections corresponding to the sections of the rim so that a section of the rim with its section of tire can be removed and replaced as a unit. This has an important advantage in that it allows wheels to be mounted between the supports for the wheel shafts as the tire can be replaced in sections without removal of the rim or spoke or like wheel structure. Such a construction of rim and tire is shown by way of example in Figs. 12 and 13. In Fig. 12 three sections 94, 95 and 96 of the tire vulcanized to three sections of rim 97, 98 and 99 respectively are shown, the outlines of the units of the rim being seen in plan in Fig. 13. The sections of the rim are secured together by screws 101, 101. Each section of the rim is formed with a lug 102 to enable it to be bolted to a spoke. To prevent side drag on a vehicle due to the obliquity of the lines of division of the tire relatively to the direction of motion the tires on the two sides of the vehicle are preferably mounted so that the lines of obliquity are in opposite directions. To facilitate this arrangement the tire and rim are constructed so that the sections may be secured to the spokes with obliquity of the lines of division in either direction. To allow of this, the line of symmetry of the external surfaces of the sections of the rim and flexible tire lie on the surface of a sphere having its center on the axis of the wheel and means are provided for securing the rim sections to the spokes which allow of the line of symmetry being inclined to one side or the other of the plane of the wheel. The curvature of the sections of the rim and tire are shown in Figs. 12 and 13 and also one construction for mounting a section of the rim in the required manner. Fig. 14 shows a section of a spoke 103, the lug 102 of the rim section being bolted to either of the two arms of the spoke.

The particular embodiments of the invention hereinbefore described are given merely by way of example, it being obvious that various modifications can be made in the methods of carrying the invention into effect.

I claim:—

1. A pneumatic tire and wheel rim comprising a rigid rim portion, a flexible tire portion sealed at its edges on to the peripheral surface of the rigid rim portion to form a closed chamber for elastic fluid and a supplementary rigid portion formed in sections on the peripheral surface of the rigid rim portion and within the said peripheral chamber for preventing complete collapse of the tire on to the rim.

2. A pneumatic tire and wheel rim comprising a rigid rim portion, a flexible tire portion sealed at its edges on to the peripheral surface of the rigid rim portion to form a closed chamber for elastic fluid and a hollow ring portion on the rigid rim portion but separable therefrom for preventing complete collapse of the tire on to the rim.

3. A pneumatic tire and wheel rim comprising a rigid rim portion, a flexible tire portion sealed at its edges on to the peripheral surface of the rigid rim portion to form a closed chamber for elastic fluid and a removable hollow ring portion resting on the rigid rim portion for preventing complete collapse of the tire onto the rim.

4. A pneumatic tire and wheel rim comprising a rigid rim portion, a chamber in said rim portion with an aperture in the peripheral surface of the rim portion, a flexible tire sealed at its edges on to the peripheral surface of the rim portion to form a closed chamber for elastic fluid and in communication through said aperture with said chamber in said rim portion and a removable rigid portion on the peripheral surface of the rigid rim portion and within said closed chamber in the tire for preventing complete collapse of the tire on to the rim.

5. A pneumatic tire and wheel rim comprising a rigid rim portion, a chamber in said rim portion with an aperture in the peripheral surface of the rim portion, a flexible tire sealed at its edges on to the peripheral surface of the rim portion to form a closed chamber for elastic fluid and in communication through said aperture with said chamber in said rim portion and a hollow rigid ring portion resting on the peripheral surface of the rigid rim portion and within said closed chamber in the tire for preventing complete collapse of the tire on to the rim.

6. A pneumatic tire and wheel rim comprising a rigid rim portion, a chamber in said rim portion with an aperture in the peripheral surface of the rim portion, cooling fins on the wall of said chamber, a non-stretchable flexible tire sealed at its edges on to the peripheral surface of the rim portion to form a closed chamber for elastic fluid and in communication through said aperture with said chamber in said rim portion and a rigid portion on the peripheral surface of the rigid rim portion and readily removable therefrom and within said closed chamber for preventing complete collapse of the tire on to the rim.

7. A wheel rim portion adapted to receive a flexible tire portion the edges of which are sealed to the peripheral surface of the rim by vulcanizing to form a chamber for elastic fluid, a chamber in said rim portion having an aperture whereby it is in communication with said first mentioned chamber and a supplementary rigid portion on the rim portion for preventing complete collapse of the tire on to the rim.

ANDREW CREERY STEVENSON.